US008893304B2

(12) United States Patent
Ayalur et al.

(10) Patent No.: US 8,893,304 B2
(45) Date of Patent: Nov. 18, 2014

(54) METHOD FOR REGISTERING A DEVICE

(71) Applicant: barnesandnoble.com llc, New York, NY (US)

(72) Inventors: Venkateswaran Ayalur, Cupertino, CA (US); Kelson Khai Dinh Tran, San Jose, CA (US); Chih-Yu Chow, Palo Alto, CA (US)

(73) Assignee: Barnes and Noble, Inc., New York, NY (US)

( * ) Notice: Subject to any disclaimer, the term of this patent is extended or adjusted under 35 U.S.C. 154(b) by 166 days.

(21) Appl. No.: 13/681,821

(22) Filed: Nov. 20, 2012

(65) Prior Publication Data

US 2014/0143894 A1    May 22, 2014

(51) Int. Cl.
*H04L 29/06* (2006.01)
*G06Q 30/06* (2012.01)

(52) U.S. Cl.
CPC .............. *H04L 63/10* (2013.01); *H04L 63/107* (2013.01); *G06Q 30/0645* (2013.01); *H04L 63/108* (2013.01)
USPC ............................................ 726/29; 705/307

(58) Field of Classification Search
CPC ..... H04L 63/10; H04L 63/107; H04L 63/108; G06Q 30/0645
USPC ............................................ 726/29; 705/307
See application file for complete search history.

(56) References Cited

U.S. PATENT DOCUMENTS

| | | | |
|---|---|---|---|
| 7,536,725 B2 | 5/2009 | Raciborski | |
| 7,653,574 B2 | 1/2010 | Harper et al. | |
| 7,684,336 B2 | 3/2010 | Cnudde et al. | |
| 8,488,661 B2 | 7/2013 | Menon et al. | |
| 2004/0039750 A1 | 2/2004 | Anderson et al. | |
| 2004/0083233 A1* | 4/2004 | Willoughby | 707/104.1 |
| 2004/0249768 A1 | 12/2004 | Kontio et al. | |
| 2005/0165726 A1 | 7/2005 | Kawell, Jr. et al. | |
| 2007/0256092 A1 | 11/2007 | Chung et al. | |
| 2008/0062940 A1* | 3/2008 | Othmer et al. | 370/338 |
| 2008/0097858 A1* | 4/2008 | Vucina et al. | 705/14 |
| 2008/0107031 A1 | 5/2008 | Cnudde et al. | |
| 2009/0055408 A1 | 2/2009 | Warren et al. | |
| 2009/0100068 A1* | 4/2009 | Gauba et al. | 707/10 |
| 2009/0106393 A1 | 4/2009 | Parr et al. | |
| 2009/0165083 A1 | 6/2009 | McLean et al. | |
| 2009/0310663 A1 | 12/2009 | Menon et al. | |
| 2011/0153833 A1 | 6/2011 | Kothari et al. | |
| 2011/0206023 A1* | 8/2011 | Cohn et al. | 370/338 |
| 2013/0134213 A1 | 5/2013 | Pallakoff et al. | |

OTHER PUBLICATIONS

Feldman, et al., U.S. Appl. No. 13/681,813, filed Nov. 20, 2012, entitled, "Method for a Transactional Flow to Enable In-Store Reading."
Feldman, et al., U.S. Appl. No. 13/681,815, filed Nov. 20, 2012, entitled, "Method for Authentication for In-Store Reading."
Feldman, et al., U.S. Appl. No. 13/681,785, filed Nov. 20, 2012, entitled, "Architecture System for In-Store Reading."
"Between Smart Clients and Access Gateway", iPass Generic Interface Specification, 2004 iPass Inc., Version 1.3, dated Sep. 4, 2004, 27 pages.

(Continued)

*Primary Examiner* — Michael S McNally
(74) *Attorney, Agent, or Firm* — Finch & Maloney PLLC

(57) ABSTRACT

A registration flow to facilitate lending of digital content at an authorized location to an authenticated electronic device.

9 Claims, 6 Drawing Sheets

(56) References Cited

OTHER PUBLICATIONS

"Open Portal—A flexible portal framework for Java," Open Portal, http://openportal.sourceforge.net/, 2 pages, printed from the Internet on Mar. 13, 2013.

"Best Current Practices for Wireless Internet Service Provider (WISP) Roaming," Wi-Fi Alliance—Wireless ISP Roaming (WISPr), Version 1.0, 37 pages, release date Feb. 2003.

Pallakoff, U.S. Appl. No. 13/910,865, filed Jun. 5, 2013, entitled, "System and Method for Transference of Rights to Digital Media via Physical Tokens."

* cited by examiner

US 8,893,304 B2

METHOD FOR REGISTERING A DEVICE

FIELD OF DISCLOSURE

This disclosure relates to digital content distribution and, in particular, to a registering a consumer system for downloading and using digital content within the confines of an authorized store.

BACKGROUND

Copyright owners have legitimate business and legal concerns regarding digital content sharing and lending. In contrast to paper copies of books and publications, copies of digital content are relatively easy to make and distribute. A secure and flexible method and system are needed for lending digital content.

BRIEF DESCRIPTION OF THE DRAWINGS

Subject matter is particularly pointed out and distinctly claimed in the concluding portion of the specification. The claimed subject matter, however, both as to organization and method of operation, together with features and advantages thereof, may best be understood by reference to the following detailed description when read with the accompanying drawings in which:

SUMMARY

One embodiment of the present invention is an in-store reading system for delivering free digital content to a customer's WiFi-enabled electronic device solely in the immediate vicinity of an authorized store. A customer may access this free, in-store digital content over an authorized store's Wi-Fi network, but only when the customer is physically in the authorized store, in accordance with some embodiments. In some cases, the electronic device must be associated with the customer's account and recognized by the in-store reading system. Digital content may be delivered to the customer's electronic device and freely used for a limited time. In one embodiment, the free digital content is delivered to a customer for an entire publication. In contrast, in another embodiment, the free digital content is delivered a "page" or chunk at a time as the customer reads. In some embodiments, once the time limit for using the digital content expires or the customer leaves the authorized store, the in-store digital content is no longer accessible to the customer. Variations and other embodiments will be apparent in light of this disclosure.

DETAILED DESCRIPTION

Figure 1:
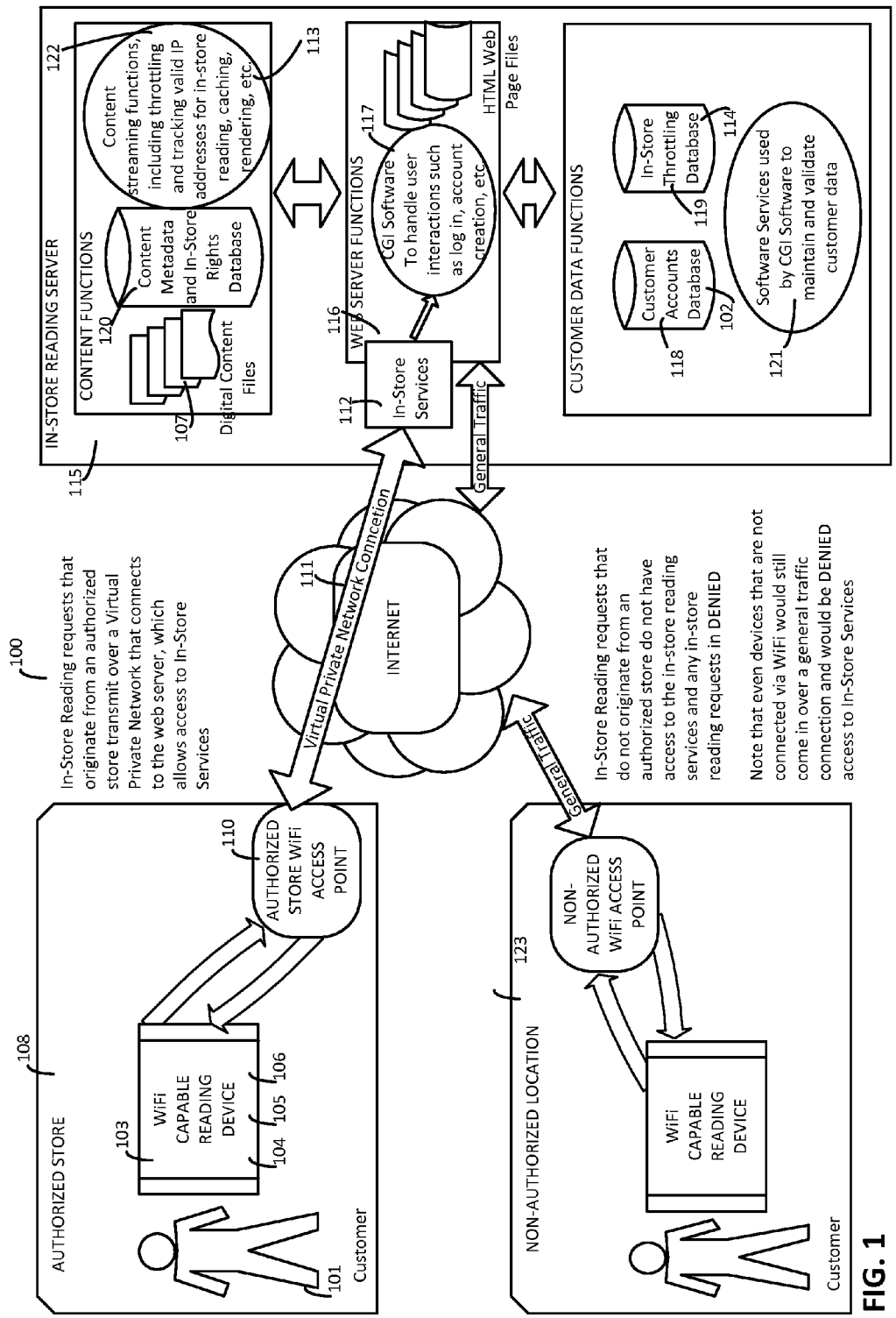
FIG. 1 shows a conceptual block diagram representation of an in-store reading system, configured in accordance with an embodiment of the present invention.

FIG. 1 shows components of in-store reading system 100 configured in accordance with an embodiment of the present invention. Customer 101 is an authorized user of in-store reading system 100. Customer 101 has account 102, which authorizes customer 101 to use in-store reading system 100. Customer 101 can access in-store reading system 100 using device 103. Device 103 is a device that customer 101 previously associated with account 102 using account credentials of customer 101. Device 103 includes device user interface 104 and device content reading application 105. Device user interface 104 enables customer 101 to interact with device 103, including logging into account 102 and engaging with device content reading application 105. Customer 101 engages with device content reading application 105 to use digital content when participating in in-store reading system 100. Device content reading application 105 includes device in-store reading interface 106 that provides the means for customer 101 to discover, request, and receive digital content 107 when customer 101 is in authorized store 108. Device 103 can be, for example, an eBook reader, a cell phone, an MP3 player, a laptop computer, a Personal Digital Assistant, or other such electronic device.

Digital content 107 is digital content with in-store reading rights. Digital content 107 is free (no cost to customer 101) and only available in authorized store 108. Authorized store 108 is a physical location with an in-store WiFi network 109 and an authorized WiFi Access Point (WAP) 110. Customer 101 is only allowed to request and receive digital content 107 on device 103 while physically located in the vicinity of authorized store 108 and connected to WAP 110. When customer 101 turns on device 103 in authorized store 108, device 103 may detect in-store WiFi network 109 and access 109 through authorized WAP 110. Once device 103 is active on in-store WiFi network 109 and customer 101 interacts with device in-store reading interface 106, transmissions to and from device 103 occur over a Virtual Private Network (VPN) 111 connection. VPN 111 secures and separates in-store reading traffic between device 103 and other electronic components of in-store reading system 100 from general traffic originating inside and outside authorized store 108.

Device in-store reading interface 106 is used by customer 101 to select and request digital content 107. Device 103 transmits a request for digital content 107 over VPN 111 to in-store web services 112. In-store web services 112 handles the request for digital content 107 and the streaming of digital content 107 back to device 103. To stream back to device 103, digital content 107 is decomposed into digital content chunk 107a, digital content chunk 107b, digital content chunk 107c, and so on. Digital content chunk 107a is an initial data portion of digital content 107 that is streamed to device 103. Digital content chunk 107b is the next data portion of digital content 107 that is streamed after 107a. Digital content chunk 107c is the next data portion of digital content 107 that is streamed after 107b and so on. The streamed delivery of digital content chunks 107a, 107b, 107c, and so on to device 103 is throttled (controlled, metered, timed) based on in-store reading throttling algorithm 113. In-store reading throttling algorithm 113 gauges the time spent and speed by which customer 101 consumes each digital content chunk of digital content 107 and adjusts the streaming of 107 accordingly. A customer content throttling record 114 associated with customer 101 and digital content 107 is maintained in a database in-store reading system 100.

In-store reading server 115 manages the delivery of digital content 107 and additional in-store reading functions of in-store reading system 100. In-store reading server 115 handles front-end functions related to web server operations and user interactions with in-store reading interfaces. In-store reading server 115 also handles all backend functions of in-store reading system 100 related to managing accounts, tracking in-store content throttling, maintaining content metadata and in-store reading rights, and providing content streaming services.

In-store reading server 115 employs web server 116 and Common Gateway Interface (CGI) software 117 to handle interactions between front-end components; such as device in-store reading interface 106 and in-store web services 112, and back-end database components of in-store reading system 100. Web server 116 services include serving up in-store web services 112. CGI software 117 services include handling log in to account 102 and processing content throttling records.

Back-end database components of in-store reading system 100 include customer accounts database 118, in-store throttling database 119, and content metadata database 120. Records for account 102 are stored and managed in customer accounts database 118. Records for customer content throttling record 114 are stored and managed in in-store throttling database 119. Content metadata database 120 serves as a source of metadata and in-store reading rights information for individual digital content items in in-store reading system 100. In-store reading rights information in content metadata database 120 indicates that digital content 107 may be used for in-store reading.

As backend components of in-store reading server 115, CGI software 117 interfaces with customer data services 121 to access customer accounts database 118 and in-store throttling database 119. Customer data services 121 processes database lookups, such as verifying customer data in account 102 for customer 101 logins. Customer data services 121 also processes database updates, such as creating and updating customer content throttling record 114.

CGI software 117 interfaces with in-store content streaming services 122 to manage content streaming functions. Such functions include throttling and tracking valid accounts and IP addresses for in-store reading, and caching and rendering digital content chunks 107a, 107b, 107c, and so on.

In FIG. 1, non-authorized location 123 is presented for illustration purposes only to show general traffic that might occur in or near a physical authorized store 108. Non-authorized location 123 is not a component within-store reading system 100.

In the preferred embodiment of the invention, in-store reading system 100 is an in-store electronic book (eBook) reading system. The embodiment of the invention is not intended to limit in-store reading system 100 to an in-store eBook reading system. In-store reading system 100 may apply to the in-store consumption of other digital content, such as digital movies, digital music, digital audio books, digital pictures, or other downloadable digital content.

In the preferred embodiment of the invention, digital content 107 is an eBook. The embodiment of the invention is not intended to limit digital content 107 to an eBook. Digital content 107 may be other digital content, such as digital movies, digital music, digital audio books, digital pictures, or other downloadable digital content.

In the preferred embodiment of the invention, device 103 is a mobile, WiFi-capable electronic reader (eReader) device. The embodiment of the invention is not intended to limit device 103 to such an eReader device. Device 103 may be another type of mobile consumer electronic device, such as a multi-purpose cell phone.

OPERATION

Figure 2:
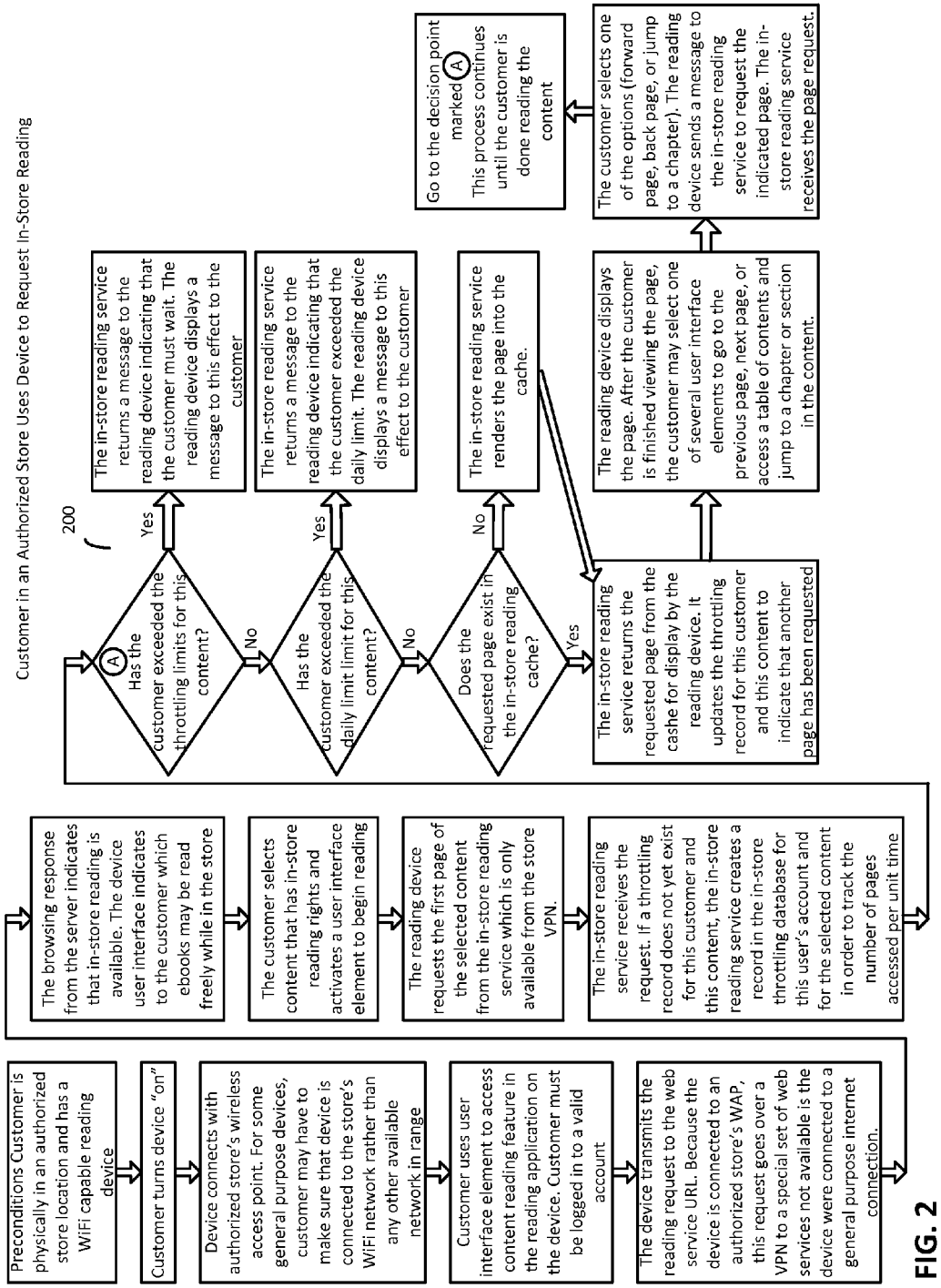
FIG. 2 shows a conceptual block diagram representation of a method for an in-store reading system where a customer uses a device to get free in-store digital content to read, in accordance with an embodiment of the present invention.

FIG. 2 shows an exemplary method 200 for requesting free in-store reading content, where a customer 101 accesses and reads digital content 107 using device 103, in accordance with an embodiment of the present invention. Customer 101 is physically located in authorized store 108 and turns on device 103. Device 103 detects that in-store WiFi network 109 is in range and connects to it through authorized WAP 110. Device 103 may be running device content reading application 105 already, or customer 101 may use device user interface 104 to invoke device content reading application 105. If customer 101 is not automatically logged into account 102, customer 101 uses device user interface 104 to log in. Customer 101 or device content reading application 105 invokes device in-store reading interface 106 to discover the availability of in-store reading system 100 and digital content 107 in authorized store 108. Device 103 transmits a request for digital content 107 over VPN 111 to the URL address of in-store web services 112. In-store web services 112 passes in the request for digital content 107 to in-store reading server 115. In-store reading server 115 responds back to in-store web services 112 that digital content 107 is available. The response that digital content 107 is available is sent by in-store web services 112 over VPN 111 to device 103. Device in-store reading interface 106 indicates to customer 101 that digital content 107 is available. Customer 101 uses device in-store reading interface 106 to select digital content 107. Customer 101 uses an appropriate control on device user interface 104 to begin reading digital content 107 using device content reading application 105.

To initiate free in-store reading of digital content 107, device 103 sends a request to get digital content 107. The request is sent over VPN 111 to the URL address of in-store web services 112. In-store web services 112 interfaces with CGI software 117 to access customer content throttling record 114 and to initiate in-store streaming throttling algorithm 113. If customer content throttling record 114 does not yet exist for customer 101 and digital content 107, customer data services 121 are invoked to create customer content throttling record 114 in the in-store throttling database 119. In-store web services 112 interfaces with CGI software 117 to invoke in-store content streaming services 122. In-store content streaming services 122 creates and caches, if necessary, and then streams digital content chunks 107a, 107b, 107c, and so on to device 103 based on how customer 101 consumes digital content 107. The streaming of digital content chunks 107a, 107b, 107c, and so on to device 103 is throttled faster or slower as determined by in-store streaming throttling algorithm 113. If customer 101 requests a digital content chunk and throttling algorithm 113 determines that the request came in too quickly based on the current throttling limits, then in-store web services 112 returns a message to device 103 indicating that customer 101 must wait before gaining access to the requested content chunk. Another factor evaluated by in-store content streaming services 122 is the time limit that customer 101 is allowed to consume digital content 107 in an already established time period. For example, customer 101 may be limited to consuming digital content 107 to two cumulative hours within a business day. If a request for a digital content chunk exceeds the time limit that customer 101 is allowed to consume digital content 107, then in-store web services 112 returns a message to device 103 indicating that customer 101 must wait before gaining access to digital content 107 again. Device 103 presents a user message to that effect to customer 101 through device in-store reading interface 106. In addition, if customer 101 exceeds an already established maximum time period for consuming an individual digital content chunk, then the timer for the time limit of digital content 107 stops. This allows customer 101 to pause from active usage of digital content 107 without negatively affecting 101's time limit for using digital content 107. For example, this allows customer 101 to pause from consuming 107, engage in a conversation, and then resume consuming 107. Because the timer stops during customer 101's pause in consuming 107, the time expended beyond the established maximum time period during the pause is not counted towards the time limit of digital content 107.

If customer 101 has not exceeded the time limit for consuming digital content 107, then in-store web services 112 checks for the availability of digital content chunk 107a rendered in an in-store reading cache on in-store reading server 115. If a rendered digital content chunk 107a does not exist in the cache, then in-store content streaming services 122 renders it into the cache. If rendered digital content chunk 107a does exist in the cache, then in-store web services 112 returns the requested digital content chunk 107a to device 103 for display. CGI software 117 invokes customer data services 121 to update customer content throttling record 114 in in-store throttling database 119.

After customer 101 finishes consuming digital content chunk 107a, customer 101 selects a control on device user interface 104 to invoke the next desired action in device content reading application 105. For example, customer 101 may select a navigation control to go to a previous page, next page, access a table of contents, or jump to a chapter or section of digital content 107. Once customer 101 makes the desired selection, device 103 transmits this next request over VPN 111 to in-store web services 112. Processing proceeds as before and, upon success, in-store web services 112 returns the requested digital content chunk 107b to device 103 for display. Processing continues as before for digital content chunk 107c and so on until customer 101 finishes or exceeds the time limit for digital content 107. If customer 101 exceeds the time limit for digital content 107, a message is returned to device 103 and a user message is displayed in device in-store reading interface 106, indicating that customer 101 must wait before gaining access to digital content 107 again.

Figure 3:
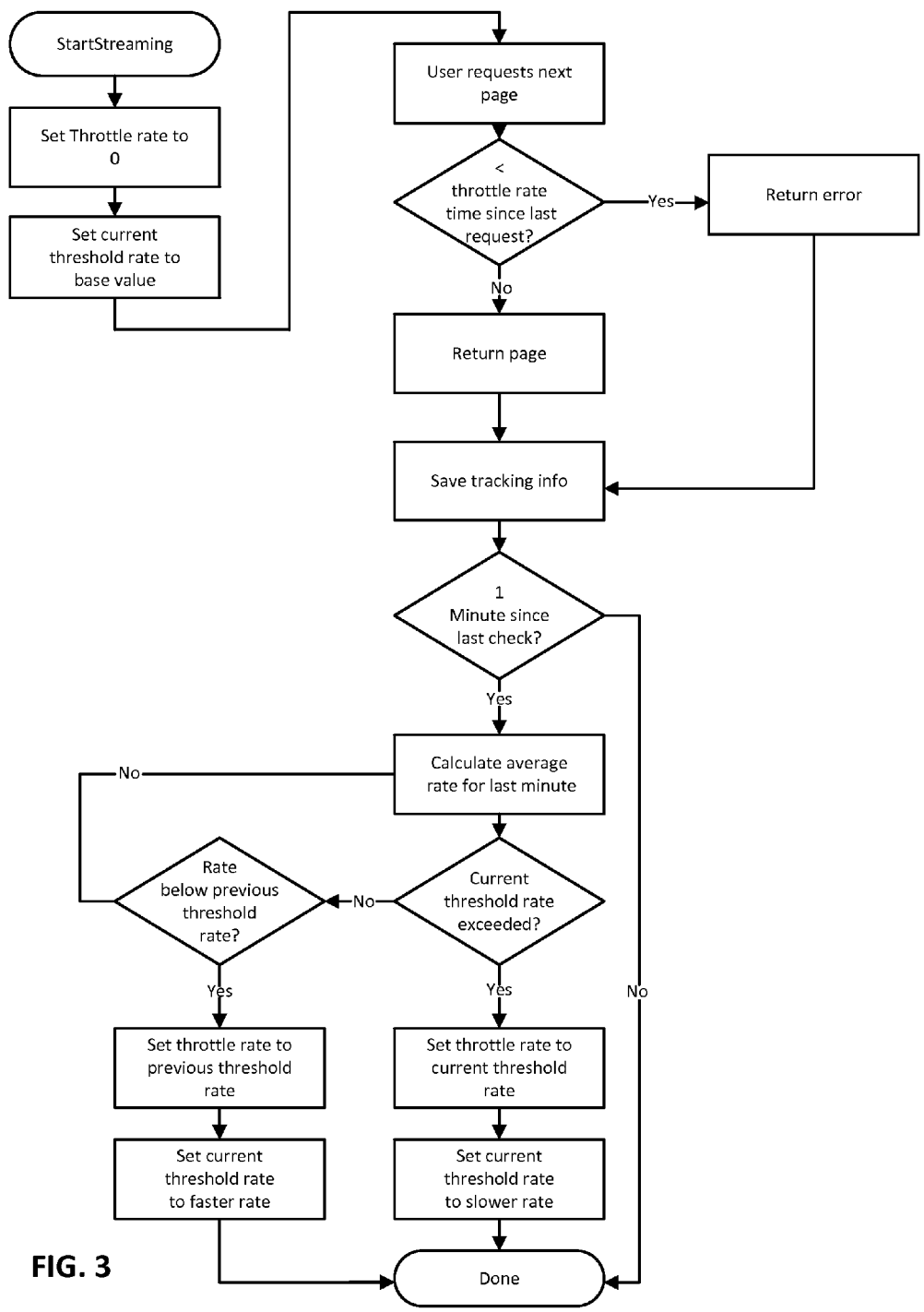
FIG. 3 shows a conceptual block diagram representation of a method for throttling the digital content that is being streamed to a customer in an in-store reading system, in accordance with an embodiment of the present invention.

FIG. 3 shows a representation of an exemplary method 300 of performing in-store streaming throttling algorithm 113, in accordance with an embodiment of the present invention. When streaming starts for digital content 107, the throttle rate is set to zero and the current threshold rate is set to a base value. Throttle rate may be, for example, one digital content chunk per 10 seconds. Current threshold rate may be, for example, two digital content chunks per 10 seconds. Any recalculation of the rates may be set to occur in less than one minute timeframes. When device 103 requests the next digital content chunk, say digital content chunk 107b, 107b is delivered and customer content throttling record 114 is updated in in-store throttling database 119. Upon device 103 requesting digital content chunk 107c, in-store streaming throttling algorithm 113 calculates the average rate of chunk requests for the last minute. If the calculated rate exceeds the current threshold rate, then the throttle rate is set to the current threshold rate and the current threshold rate is set to a slower rate. If the calculated rate does not exceed the current threshold rate and is below the previous threshold rate, then the throttle rate is set to the previous threshold rate and the current threshold rate is set to a faster rate. Throttling calculations stop when customer 101 becomes inactive for the maximum time set for a customer to reasonably consume a digital content chunk.

Figure 4:
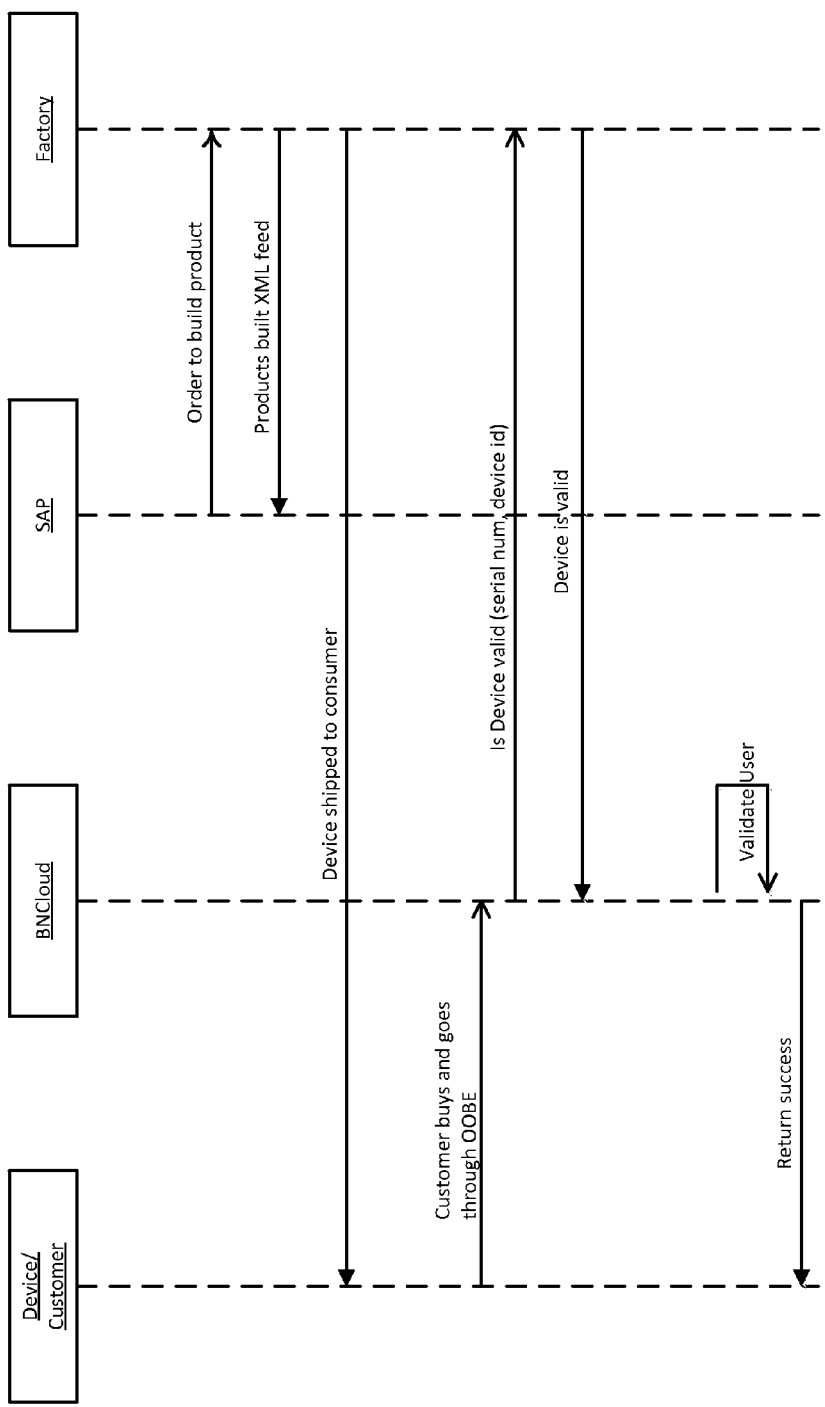
FIG. 4 shows an initial registration flow for an electronic device to facilitate a single solution across multiple vendors and to facilitate in-store reading, in accordance with an embodiment of the present invention.

FIG. 4 shows an initial registration flow for an electronic device to facilitate a single solution across multiple vendors and to facilitate in-store reading, and in accordance with one embodiment of the present invention.

As electronic manufacturers enter various domestic and international markets, a need exists to simplify the build process to support the multiple markets. This flow facilitates a generic build to be used across multiple vendors. The following flow describes the build process and association with a vendor.

Initially, an order request from a business software application to the factory starts the manufacture and XML generation that contains an EAN. A reply back to the business software is forwarded to the cloud wherein the EANs are ingested from the XML (eXtensible Markup Language). Consequently, the electronic device is shipped to the consumer and initiates a device registration to the cloud from the customer. The cloud performs a lookup for the Vendor based on the serial number and EAN and the electronic device is associated with the vendor info and system locale.

Figure 5:
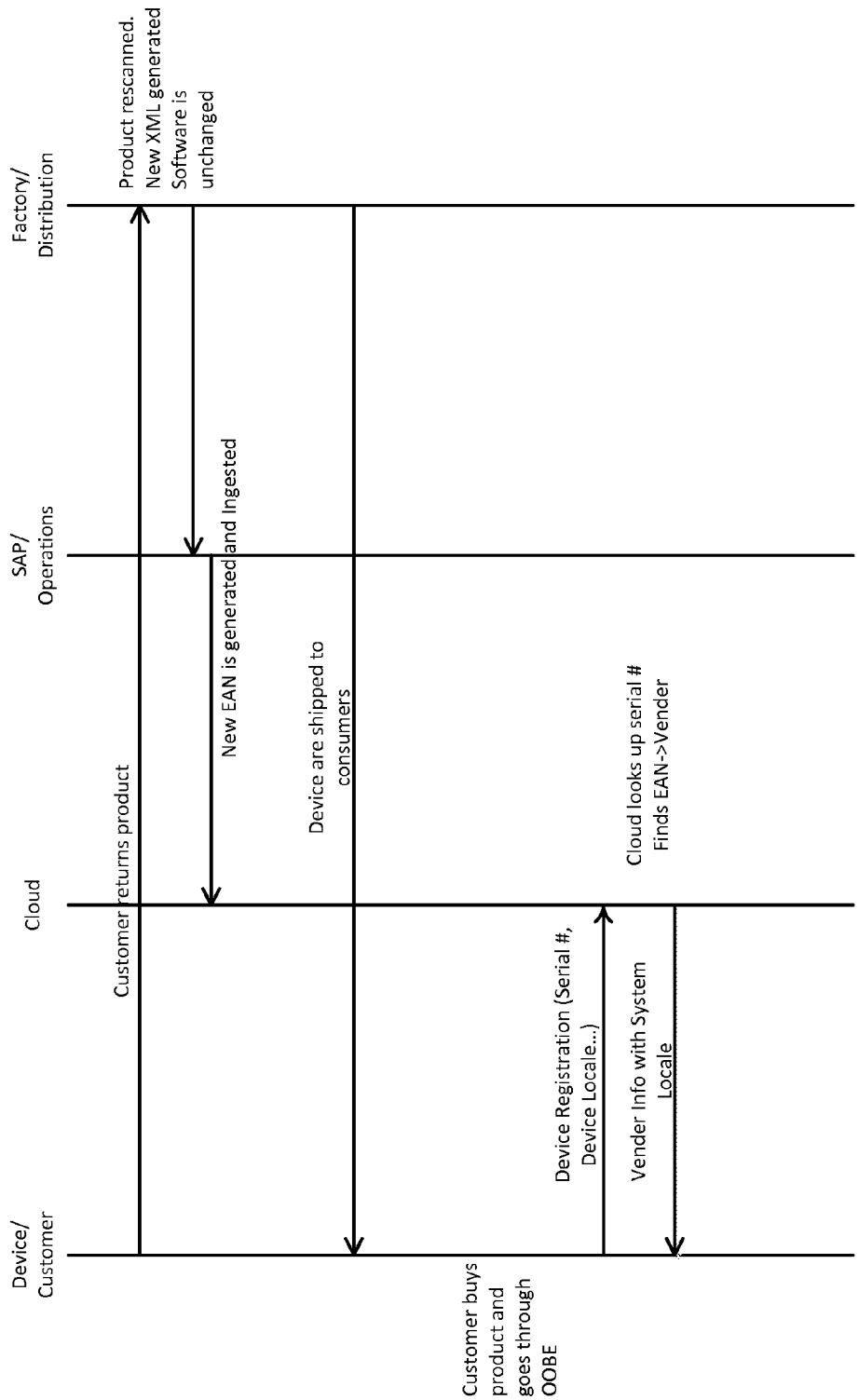
FIG. 5 shows an re-routing flow for an electronic device to facilitate a single solution across multiple vendors and to facilitate in-store reading, in accordance with embodiment of the present invention.

FIG. 5 shows a re-routing flow for an electronic device to facilitate a single solution across multiple vendors and to facilitate in-store reading, in accordance with an embodiment of the present invention.

This flow describes the process if the electronic device is returned from a customer or is re-routed from one vendor to another. Upon return, the product is rescanned and a new XML is generated by the Factory. Consequently, a new EAN is generated and ingested by the business software and cloud. The similar process is followed by device registration.

Figure 6:
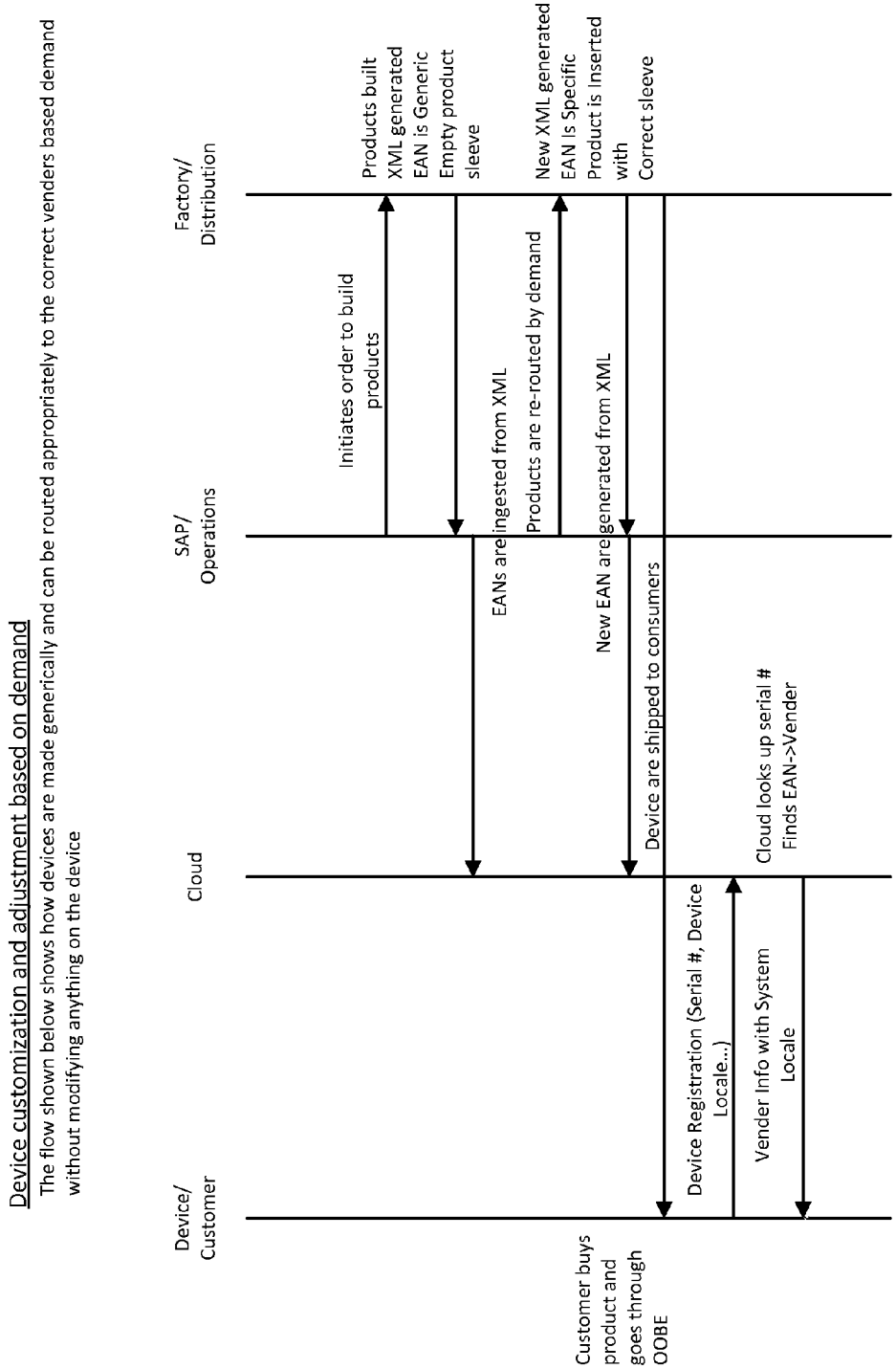
FIG. 6 shows a flow for customization and adjustment based on demand for an electronic device to facilitate a single solution across multiple vendors and to facilitate in-store reading, in accordance with an embodiment of the present invention.

FIG. 6 shows a flow for customization and adjustment based on demand for an electronic device to facilitate a single solution across multiple vendors and to facilitate in-store reading, in accordance with one embodiment. In this flow, another step is added wherein an electronic device is re-routed based on demand by the business software to create a new XML.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for facilitating a lending of digital content to an electronic device comprising:
   registering the electronic device based on generating XML that results in associating an EAN to a vendor;
   requesting an identification associated with an authorized location, wherein the electronic device is in relative proximity to the authorized location; authenticating the electronic device to receive the loan of the digital content based at least in part on proximity to an authenticated location that allows the loan of digital content and for a predetermined duration of time; and
   granting access to the electronic device based on a Radius protocol from a server system.

2. The method of claim 1 wherein the authenticating the electronic device is based on a SSID.

3. The method of claim 1 wherein the electronic device is an ebook reader.

4. The method of claim 1 wherein the identification for the authorized location is a commercial location with an access point.

5. The method of claim 4 wherein the access point communicates with an AAA server via a secure path.

6. The method of claim 5 wherein the authentication with the AAA server utilizes a Radius protocol.

7. A system for facilitating the loan of digital content comprising:
   a first server system to receive a request containing a serial number for an electronic device for a loan of digital content based at least in part on the electronic device's proximity to an authenticated location that allows the loan of digital content,
   the first server to authenticate the electronic device based on the serial number;
   the first server system to send a reply to a second server system to approve the loan of the digital content to the requesting electronic device if the electronic device has been registered based on the second server system registering the electronic device based on XML that results in associating an EAN to a vendor.

8. The system of claim 7 further comprising an access point.

9. The system of claim 8 wherein the access point communicates with the first server system and the second server system.

* * * * *